(12) United States Patent
Young

(10) Patent No.: US 6,437,035 B1
(45) Date of Patent: Aug. 20, 2002

(54) FLAME RETARDANT THERMOPLASTIC ELASTOMER FILM COMPOSITION

(75) Inventor: Robert E. Young, Marietta, OH (US)

(73) Assignee: RJF International Corporation, Fairlawn, OH (US)

( * ) Notice: Subject to any disclaimer, the term of this patent is extended or adjusted under 35 U.S.C. 154(b) by 83 days.

(21) Appl. No.: 09/704,954

(22) Filed: Nov. 2, 2000

(51) Int. Cl.[7] .............................. C08K 3/22; C08K 3/38; C08K 5/06

(52) U.S. Cl. ........................ 524/430; 524/89; 524/371; 524/405; 524/515; 524/525

(58) Field of Search ............................ 524/87, 89, 371, 524/405, 430, 437, 515, 525

(56) References Cited

U.S. PATENT DOCUMENTS

| | | | |
|---|---|---|---|
| 4,255,318 A | * | 3/1981 | Kaide |
| 5,158,999 A | * | 10/1992 | Swales |
| 5,576,374 A | | 11/1996 | Betso et al. |
| 5,750,600 A | | 5/1998 | Nokozido et al. |
| 5,763,534 A | | 6/1998 | Srinivasan et al. |
| 5,773,515 A | | 6/1998 | Srinivasan et al. |
| 5,783,629 A | | 7/1998 | Srinivasan et al. |
| 5,834,381 A | | 11/1998 | Roe et al. |
| 5,843,577 A | | 12/1998 | Ouhadi et al. |
| 5,905,116 A | | 5/1999 | Wang et al. |
| 5,910,530 A | | 6/1999 | Wang et al. |
| 5,910,540 A | | 6/1999 | Takahashi |
| 5,912,296 A | | 6/1999 | Wang et al. |
| 5,985,971 A | | 11/1999 | Srinivasan et al. |
| 5,998,524 A | | 12/1999 | Srinivasan et al. |

* cited by examiner

*Primary Examiner*—Christopher Henderson
(74) *Attorney, Agent, or Firm*—George W. Moxon, II; Brouse McDowell

(57) ABSTRACT

A thermoplastic elastomer composition for use in automotive interiors, wallcoverings, upholstery, advertising banners and films and tenting which comprises a major amount of a thermoplastic elastomer or elastomers having a weight average melt index of less than 6, a minor amount of a polymeric elastomer, a flame retardant, a maleated polypropylene, and a filler material.

29 Claims, No Drawings

FLAME RETARDANT THERMOPLASTIC ELASTOMER FILM COMPOSITION

BACKGROUND OF THE INVENTION

The present invention is related to a flame retardant thermoplastic elastomer film composition for use in forming films for use in automotive interiors, wallcoverings, upholstery, advertising films, and tenting materials, which employs a maleated polypropylene to improve the physical properties such as melt processing, tear strength, and tensile properties while allowing the incorporation of more flame retardant into the composition.

Thermoplastic elastomer compositions are known for their rubbery characteristics and frequently are used to modify polyolefin compositions, such as polyethylene and polypropylene. Often these thermoplastic elastomers are copolymers of ethylene and olefins, such as butene or octene, which are produced with metallocene or Kaminsky catalysts. One example of a polyolefin/thermoplastic elastomer blends are U.S. Pat. No. 5,998,524 to Srinivasan et al (and related U.S. Pat. Nos. 5,763,534; 5,773,515; 5,703,629; and 5,985,971), which disclose a composition having a majority of polyolefin, modified by the elastomeric component. Another example is U.S. Pat. No. 5,834,381 to Roe et al, which discloses a rubber (i.e., an elastomer) modified polypropylene which is 10 mils in thickness, is flame retardant, and is laminated to a scrim for use as auto security shades or covers. U.S. Pat. No. 5,576,374 to Betso et al discloses a polyolefin combined with a thermoplastic elastomer for use in filled composites and to make molded parts. U.S. Pat. No. 5,750,600 to Nozokido et al discloses an oil-extended olefin thermoplastic elastomer composition for use in skins of interior automotive trim. The Nozokido composition has a majority of elastomer (i.e., 50 to 70%) and 30 to 50% of a combination of polypropylene resins having different crystal melting points and is used to make sheets having a thickness of 0.25 to 0.45 mm. As noted in Nozokido, when the elastomer content is higher than 70% by weight, problems in manufacturing are encountered and vacuum forming suffers.

Maleated polypropylenes are substituted polyolefins which have been used to copolymerize with thermoplastic elastomers or as compatabilizers for thermoplastic elastomers. For example, U.S. Pat. Nos. 5,912,296, 5,910,530, and 5,905,116, to Wang, et al., disclose a process for preparing an oil extended graft copolymer compositions that are composed of a maleated polypropylene grafted to a functionalized thermoplastic elastomer. However, no prior art has taught maleated polypropylene as compatibilizing the flame retardants and fillers, enhancing the physical properties and allowing higher levels of flame retardant and filler while being processed. U.S. Pat. No. 5,910,540, to Takahashi, discloses a thermoplastic elastomer composition that exhibits favorable heat fusion properties, and a maleated polyolefin, such as a maleated polypropylene, is added to the composition as a compatibilizer. However, Takahashi is distinguishable from the present invention because Takahashi teaches the maleated polyolefin as a compatibilizer for different polymers, mainly a modified polystyrene. It also does not teach the maleated polyproplene as enhancing the physical properties and allowing more flame retardant to be incorporated. Although U.S. Pat. No. 5,843,577, to Ouhadi et al. discloses a thermoplastic elastomer having improved surface properties due to the addition of, among other things, certain types of maleated polypropylenes, it also is distinguishable in that the maleated polypropylene is compatibilizing different materials and does not enhance physical properties that allow the incorporation of additional flame retardant.

SUMMARY OF THE INVENTION

The present invention has resulted from the discovery that a composition which comprises a major amount of a thermoplastic elastomer or a blend of thermoplastic elastomers having an average melt index of less than 6, a minor amount (i.e., less than 30% by weight) of polymeric elastomer, a maleated polypropylene, a flame retardant, and a filler material results in a thermoplastic elastomer film composition that has improved physical properties, processing, and flame retardancy while being useful for automotive interiors, wallcoverings, upholstery, advertising films or banners, and tenting. The composition is processable by calendering to make films having a thickness of less than 10 mils. The film can then be handled to be combined with other films or to be bonded to other support materials such as scrim fabrics.

DETAILED DESCRIPTION OF THE INVENTION

The thermoplastic elastomer composition for use in automotive interiors, wallcoverings, upholstery, advertising banners, and tenting comprises a major amount of a thermoplastic elastomer or a blend of thermoplastic elastomers having an average melt index of less than 6, a minor amount of a a polymeric elastomer (i.e., less than 30% by weight), a maleated polypropylene, a flame retardant, and a filler material.

The thermoplastic elastomer (or "TPE") can be any copolymer of ethylene and a $C_3$ to $C_8$ olefin produced with a metallocene or Kaminsky catalyst (or "single site") catalysts and having a molecular weight distribution (Mw/Mn) of less than or equal to 3 is contemplated for use as this component. Examples are copolymers of ethylene and butene, copolymers of ethylene and hexene and copolymers of ethylene and octene. It is preferred that the TPE is a mixture of TPE's, where the TPE's have different melt indexes with one being higher than the other, but with the weighted average melt index being less than 6, less than 3 and less than 2 being also preferred. Examples of TPEs are the Exact® polymers from Exxon Mobil Chemical. The TPE will be present in a majority amount of from 50% by weight to about 95% by weight based upon the weight of all of the polymers. Preferably, the TPE is more than 60% by weight, with more than 80% by weight being further preferred.

The "polymeric elastomer" is a rubbery elastomer which will provide improved tear and elongation at break in the TPE composition and is preferred to be one of, but not limited to, a styrene-ethylene-butylene or "SEB" rubber with a Shore "A" hardness of 60 to 80, and a solution (25% weight in toluene viscosity of 6,000 to 9,000 CPS), a non-vulcanized chlorinated polyethylene with a chlorine content of between 30 and 42%, and a mooney viscosity (MS 1+4 121C) of between 42 and 94; and an (ethylene/vinyl acetate) copolymer or (ethylene/carbon monoxide) copolymer with a melt flow index of between 8 and 100 and a crystalline melt temperature of between 59 and 70° C. Examples of polymeric elastomers are Kraton(D G-1650 thermoplastic rubber, which is a styrene-ethylene-butylene block copolymer, Elvaloy® HP511 resin from duPont, which is an ethylene vinyl acetate copolymer, and Tyrin 3615 from duPont Dow Elastomers, which is a chlorinated polyethylene. The polymeric elastomer will be present in a minor amount, about 1% to 30% by weight based upon the total weight of the polymers, preferably up to 20% by weight, with up to 10% by weight being further preferred.

The TPE composition of the present invention is achieved using processing equipment, which is typical for such materials. For example, in the preferred process, the ingredients will be weighed, pre-blended, mixed in a Banbury mixer, then passed through two 2-roll mills, a strainer extruder, and finally, calendered on an inverted "L" calender. There is no criticality in the equipment as long as it effectively mixes the composition and produces a thin film having an appropriate surface finish. It is preferred that the olefin thermoplastic elastomer composition for use in the present invention be prepared by blending together the components without the formation of crosslinking, from the viewpoint of formability at the final calendering and workability at lamination and/or vacuum forming.

For example, the thermoplastic elastomer composition can be prepared by preparing specified amounts of the ethylene/alpha-olefin copolymer elastomer and the polypropylene resin, charging them into an agitation mixer such as Henschel mixer (trade name), a supermixer or a tumbler mixer and effecting agitation blending generally for 1 to 10 min. In particular, while the use of the tumbler mixer takes about 10 min, the supermixer advantageously enables preparing the desired composition by agitation blending within about 3 min. According to necessity, the olefin thermoplastic elastomer composition can be melt kneaded by the use of a screw extruder or the like generally at 170° C. to 250° C., preferably, 210° C. to 230° C. and thereafter pellet It may be desirable, on occasion, to employ a mineral oil in the present invention to improve not only the formability at calendering but also the capability of enhancing the mechanical properties of obtained shaped items suitable from the viewpoint of the hue and odor. In the selection of the mineral oil, the use of high-boiling-point oil fractions such as paraffinic, naphthenic, and aromatic mineral oils is preferred from the viewpoint of improving the formability. In this thermoplastic elastomer composition, the present invention, 0 to 30 parts by weight, preferably, 5 to 10 parts by weight of mineral oil is employed per 100 parts by weight of the thermoplastic elastomer composition, i.e., the total amount of the TPE, the polyolefin, and the polymeric elastomer.

The choice of the polymeric elastomer is dependent on the final physical properties desired, which can include tensile strength, % extensibility, flammability, and cold temperature performance. Modifications would need to be made to the formula to allow for processing differences. Chlorinated polyethylene, in particular, would have to be used with a reduced amount of paraffinic, napthenic and aromatic oil or excessive sticking to heated processing rolls would be encountered.

The maleated propylene functions as a compatibilizer for this composition. Its function is to improve the melt processing, physical properties and flame retardancy of the composition by increasing the amount of flame retardant that can be loaded into the composition. The preferred maleated polypropylene is a polypropylene homopolymer modified with maleic anhydride as a functional monomer. These are available from Uniroyal Chemical as Polybond® 3150 (melt flow rate of 509 g/10 min at 210° C. and 2.16 kg) and 3200 (melt flow rate of 110 g/10 min at 190° C. and 2.16 kg). The maleated polypropylene will be present in an amount of about 0.25% to about 5%. Amounts of 2% are preferred.

The flame retardant(s) to be employed in this invention include alumina trihydrate antimony trioxide, barium metaborate, decabromo diphenyl oxide, ethylene bis (tetrabromophthalimide), tetradecabromodiphenoxybenzene, ethylenebis (dibromonorbornanedi-carboximide), or any combination thereof. The combination of alumina trihydrate, barium metaborate and antimony trioxide is preferred, with the alumina trihydrate comprising the majority (i.e., more than 60% by weight) of the combination, and the barium metaborate and antimony trioxide comprising a minority (i.e., less than 30% by weight) for each, of the combination. Further, the combination can be employed with or without a bromine containing flame retardant, such as decabromo diphenyl oxide. The flame retardant will be present in an amount of about 15% to about 70%. Amounts of 45% are preferred.

The filler materials can be any of those normally used with film forming plastics. The thermoplastic elastomer composition of the present invention may be loaded with various additives and fillers in amounts not detrimental to the objects of the present invention. Examples of such other additives include antioxidants, antistatic agents, ultraviolet absorbers, age resistors and pigments. The filler will be present in an amount of about 5% to about 50% by weight based upon the weight of the polymers, i.e., the weight of the TPE plus the polyolefin plus the polymeric elastomer. Amounts of less than 40%, 30%, 20%, and 10% by weight are preferred.

The composition can include useful additives including for example, process stabilizers, antioxidants, ultraviolet absorbers, soap, such as metal soaps, anti-static agents, lubricants, nucleating agents, pigments, and dispersants for pigments.

In the calendering of the nonflammable olefin thermoplastic elastomer composition for use in making films in accordance with the present invention, the lubricant for use in the present invention imparts fluidity to the molten thermoplastic elastomer composition while maintaining a certain degree of compatibility therewith, so that the frictional resistance on the roll surface is reduced. This prevents the sticking of the composition to rolls and facilitates the forming of the composition. Examples of the lubricants exerting the above functions include higher paraffinic hydrocarbons; higher fatty acid compounds such as higher fatty acids, metal salts of higher fatty acid, higher fatty acid amides and alkyl esters of higher fatty acid (e.g., esters of higher fatty acids and aliphatic monohydric or polyhydric alcohols); higher aliphatic alcohols; polyethers; aromatic carboxylic acid compounds such as phthalic acid diamides and phthalic acid esters; diamine/carboxylic acid condensates; silicones (silicon resin); natural and synthetic rosin; and composite lubricants composed of at least two thereof. Specific examples of the above lubricants include paraffin wax, polyethylene wax, montan wax and hardened castor oil, such as the higher paraffinic hydrocarbon; stearic, palmitic, lauric and oleic acids as the higher fatty acid; magnesium, calcium, aluminum and zinc stearates as the metal salt of higher fatty acid; stearamide, oleamide, lauramide, ethylenebisstearamide, ethylenebislauramide and stearoleamide as the higher fatty acid amide; butyl stearate, ethylene glycol monostearate and glycerol distearate as the alkyl ester of higher fatty acid; stearyl, palmityl, oleyl and lauryl alcohols as the higher aliphatic alcohol; ethylene oxide/propylene oxide copolymer as the polyether; bis(2-ethylhexyl)phthalate as the phthalic acid ester; xylylenediamine/aliphatic carboxylic acid condensates (wax: for example, having approximately 1,000 of average molecular weight) as the diamine/carboxylic acid condensate; and polydimethylsiloxane as the silicone. These lubricants may be used either individually or in combination.

In the sheeting by calendering and postforming by vacuum forming, the use of a composition in which the amount of added lubricant is far smaller than 0.1 part by weight encounters the problem that excessive sticking of the composition to calender rolls occurs. On the other hand, when the amount of added lubricant is far larger than 3 parts by weight, problems are encountered. Not only does the lubricant migrate to the sheet surface during or after the forming with the result that winding of the composition around the calender rolls is often unsatisfactory during calendering, but also the produced sheet has poor coatability and/or a poor appearance.

A vital component to calendering films under 0.010 inches (0.25 mm) is having a wide processing window; a narrow processing window precludes the physical handling of film on the calender and calender train rolls; materials such as flexible and rigid PVC, ABS and various rubber compounds can all be readily calendered as they are classified as having an amorphous molecular structure and thus a wide processing window. Other polymers such as polystyrene, nylon, polyethylene, polypropylene, are classified as having a crystalline molecular structure and thus a narrow processing window. These types of polymers are processable by extrusion, injection molding and blow molding.

The formulations disclosed within the terms of the present invention may also comprise any additives or fillers commonly in usage with the products of the present invention. The following examples are illustrative of the present invention, and should not limit the scope of the invention.

TYPICAL EXAMPLE

The composition to be tested was made by weighing out the ingredients set forth in Table 1. They were then put on a two-roll laboratory mill for 5 minutes to combine the ingredients and produce a film for evaluation. After 5 minutes, the composition was sheeted off the mill and tested for physical properties as set forth in Table 1.

As can be seen, the composition produced a film 8 mils thick and capable of handling for purposes of creating composite materials such as by laminating to other films, including supporting scrims and the like, and achieved a limiting oxygen index of 26 to 31.

TABLE I

| | Example 1 | Example 2 | Example 3 | Example 4 | Example 5 | Example 6 | Example 7 | Example 8 | Example 9 |
|---|---|---|---|---|---|---|---|---|---|
| COMPOSITION | | | | | | | | | |
| Exact 4033 | 40 | 40 | 40 | 40 | 40 | 40 | 40 | 40 | 40 |
| Styrene Butadiene Elastomer | | | | | | | | | |
| Chlorinated Polyethylene | 40 | 40 | 40 | 40 | 40 | 40 | 40 | 40 | 40 |
| Alumina Trihydrate | 260 | 200 | 165 | 40 | 40 | 40 | 40 | 40 | 40 |
| Clay | 10 | 10 | 10 | 10 | 10 | 10 | 10 | 10 | 10 |
| Barium Metaborate | 20 | 30 | 25 | 4 | 4 | 4 | 4 | 4 | 4 |
| Napthenic Oil | 5 | 5 | 5 | 5 | 5 | 5 | 5 | 5 | 5 |
| Calcium Stearate | 2 | 3 | 3 | 6 | 6 | 6 | 6 | 6 | 6 |
| TPE Stabilizer Blend* | 3 | 3 | 3 | 3 | 3 | 3 | 3 | 3 | 3 |
| Solid Epoxy | 1 | 1 | 1 | 1 | 1 | 1 | 1 | 1 | 1 |
| Exact 4049 | 40 | 40 | 40 | 40 | 40 | 40 | 40 | 40 | 40 |
| Maleated Polypropylene | 3 | 3 | 3 | 3 | 3 | 3 | 3 | 3 | 3 |
| Antimony Trioxide | 20 | 20 | 20 | 8 | 16 | 8 | 16 | 24 | 24 |
| Saytex 102E | | | | 25 | 50 | | | 75 | |
| Saytex 8010 | | | | | | 25 | 50 | | 75 |
| TOTAL | | | | | | | | | |
| PROPERTIES: | | | | | | | | | |
| Limiting Oxygen Index | 30 | 28 | 28 | 26 | 30 | 27 | 31 | 31 | 31 |
| Gauge | 8 mil | 7.5 mil | 8.5 mil | 5.5 mil | 5.5 mil | 6 mil | 5 mil | 5.5 mil | 5 mil |
| ELMENDORF TEAR: | | | | | | | | | |
| Lateral | 20 | 13 | 21 | 26 | 21 | 18 | 23 | 15 | 13 |
| Transverse | 37 | 72 | 100 | 76 | 86 | 76 | 81 | 78 | 77 |
| TENSILE PROPERTIES: | | | | | | | | | |
| Lateral: | | | | | | | | | |
| Strength | 605 | 774 | 747 | 1347 | 920 | 1143 | 1000 | 793 | 890 |
| 100% Mod | 513 | 555 | 565 | 543 | 534 | 522 | 556 | 496 | 563 |
| % Elongation | 230 | 448 | 350 | 768 | 537 | 691 | 544 | 456 | 490 |
| Transverse: | | | | | | | | | |
| Strength: | 450 | 762 | 615 | 1144 | 826 | 1048 | 977 | 878 | 762 |
| 100% Mod | 370 | 553 | 377 | 374 | 375 | 364 | 367 | 348 | 631 |
| % Elongation | 441 | 520 | 684 | 861 | 774 | 828 | 855 | 790 | 736 |
| COLD CRACK: | | | | | | | | | |
| 10 lb. Roller | Ok − 60 | Ok − 80 | Ok − 70 | Ok − 60 | Ok − 60 | Ok − 60 | Ok − 60 | Ok − 60 | Ok − 60 |
| Masland | −30 | −30 | −30 | Ok − 70 | Ok − 70 | Ok − 70 | Ok − 70 | Ok − 60 | Ok − 60 |

The key to the present invention is the choice of thermoplastic elastomer to simulate the processing window of flexible PVC. These unique materials allow the calendering of thin gauge films.

Table I demonstrates the maleated polypropylene acts as a compatibilizer with a variety of compositions consisting of polymeric elastomers and flame retardants. Each example demonstrates that a composition containing maleated polypropylene has both a high level of flame retardancy and improved physical properties.

TABLE II

TPE Stabilizer Blend

| Ingredient | Amount (Parts per Weight) |
|---|---|
| Calcium carbonate | 2 |
| Ultranox 877A | 0.5 |
| Calcium stearate | 1 |
| Tinuvin 770 | 0.3 |
| Tinuvin 327 | 0.3 |
| Viton fluoropolymer | 0.353 |
| Kemamide E Lubricant | 0.2 |

In Example 1 and in the subsequent examples, the identification and source of the ingredients is as follows in Table III.

TABLE III

| Ingredient | Manufacturer |
|---|---|
| Exact 4033 is an ethylene/butene thermoplastic elastomer having a melt index of 0.8 | Exxon Mobil Chemicals |
| Kraton G-1651 SEB polymeric elastomer | Shell Chemical |
| Alumina Trihydrate | Solem |
| Clay (available as Polyfil 40 or 90) | J M Huber Corporation |
| Araldite GT-7012 is a Solid Epoxy | Durr Marketing |
| Exact 4049 is an ethylene/butene thermoplastic elastomer | Exxon Mobil Chemicals |
| Calcium Carbonate | ECC International |
| Ultranox 877A Antioxidant is a 2:1 blend of bis (2,4-di-t-butylphenyl/pentaerythritol diphosphate and octadecyl 3,5 di-tertabutyl-4-hydroxy hydrocinnamate | GE Plastics |
| Calcium Stearate | Reagens S.P.A. |
| Tinuvin 770 Antioxidant is a 2-(3',5'-di-tert-butyl-2'-hydroxyphenyl)-5-chlorobenzotrizole ultraviolet screener | Ciba-Geigy |
| Tinuvin 327 UV Screener is a bix (2,2,6,6-tetramethyl-4-piperridinyl) sebacate antioxidant | Ciba-Geigy |
| Viton is a fluoropolymer | Dow Dupont Elastomers |
| Kemamide E Lubricant is a Erucamide | Witco Corporation |
| Shellflex 371 is a Napthenic oil | Shell Chemical |
| Tyrin 3615P is a chlorinated polyethylene polymeric elastomer | Dow DuPont Elasomers |
| Exact 4049 is an ethylene/butene thermoplastic elastomer having a melt index of 4.5 | Exxon Mobil Chemicals |
| Polybond 3200 is maleic anhydride | Uniroyal Chemical |
| Saytex 102E is decabromodiphenyl oxide | Albemarle Corporation |
| Saytex 8010 is a proprietary flame retardant composition | Albemarle Corporation |
| Antimony Trioxide | Mallinckrodt Baker, Inc. |
| Flamebloc 440 is a borate-based fire retardant | Buckman Laboratories |
| Kemamide is a mold release lubricant | Calwax Corporation |

Additional examples were run, in accordance with the general example, to further evaluate the composition of the present invention. In Examples 11–15, the compositions and results for which are set forth in Table IV, demonstrate the benefit, to the overall properties of the flame retardant composition, of using a maleated propylene. Plus, additional tests to demonstrate the flame retardant properties, namely Underwriters Laboratories test UL94 was run. A reading of zero is the highest flame retardant result, while a reading of two is the lowest result, which is considered passing.

TABLE IV

|  | Example 10 | Example 11 | Example 12 | Example 13 | Example 14 | Example 15 |
|---|---|---|---|---|---|---|
| COMPOSITION | | | | | | |
| Exact 4033 TPE | 40 | 40 | 40 | 40 | 40 | 40 |
| Kraton g1651 SEB Rubber | | | | | | |
| Tyrin 3615p Chlorinated Polyethylene | 40 | 40 | 40 | 40 | 40 | 40 |
| Alumina Trihydrate | 260 | 200 | 165 | 260 | 200 | 165 |
| Flamebloc 440, Barium Metaborate | 20 | 30 | 25 | 20 | 30 | 25 |
| Shellflex 371, Napthenic oil | 5 | 5 | 5 | 5 | 5 | 5 |
| Clay | 3 | 3 | 3 | 3 | 3 | 3 |
| TPE Stabilizer Blend (see Table II) | 3 | 3 | 3 | 3 | 3 | 3 |
| Araldite GT-7012, Solid Epoxy | 1 | 1 | 1 | 1 | 1 | 1 |
| Exact 4049, TPE | 40 | 40 | 40 | 40 | 40 | 40 |
| Calcium Stearate | 2 | 3 | 3 | 2 | 3 | 3 |
| Ultranox 877 | 1 | 1 | 1 | 1 | 1 | 1 |
| Polybond3200, Malcated Polypropylene | 3 | 3 | 3 | | | |
| Antimony Trioxide | 20 | 20 | 20 | 20 | 20 | 20 |
| PROPERTIES | | | | | | |
| Limiting Oxygen Index % | 31 | 29 | 27 | No test | 29 | 28 |
| Gauge | 13.5 | 12 | 14 | | 11 | 11 |
| Elmendorf Tear (grams/mil) | | | | | | |
| TD | 31 | 43 | 49 | Stuck to mill | 47 | 46 |
| MD | 82 | 125 | 100+ | | 154+ | 154+ |
| Tensile Properties | | | | | | |
| TD | | | | | | |
| Tens. Str. | 306 | 701 | 772 | | 649 | 594 |
| 100% Mod | 158 | 475 | 495 | | 388 | 323 |
| % Elongation | 590 | 826 | 896 | | 799 | 812 |
| MD | | | | | | |

TABLE IV-continued

|  | Example 10 | Example 11 | Example 12 | Example 13 | Example 14 | Example 15 |
|---|---|---|---|---|---|---|
| Tens. Str. | 473 | 786 | 871 |  | 704 | 793 |
| 100% Mod | 317 | 605 | 642 |  | 349 | 631 |
| % Elongation | 606 | 503 | 573 |  | 609 | 625 |
| Cold Crack |  |  |  |  |  |  |
| 10 lb. Roller Masland |  |  |  |  |  |  |
| UL 94 VTM | 0 | Fail | Fail | No Test | 0 | Fail |
| Shore A | 85 | 85 | 85 |  | 82 | 82 |
| General comments | Milled ok | Milled ok | Milled ok | Stuck to Mill | Hard to Release from Mill | Hard to Release from Mill |

Table IV demonstrates how the maleated polypropylene is critical to producing a flame-retardant composition that maintains an excellent balance of physical properties so that the films can be produced and handled. Examples 10, 11, and 12, contain maleated polypropylene. Examples 13, 14, and 15 are identical to 10, 11, and 12 but they contain no maleated polypropylene.

In comparing 10 to 13, 11 to 14, and 12 to 15, it can be observed that the maleated polypropylene aided processing and helped to improve the tensile strengths of the respective formulas. The comparison of Example 10 to 13 is particularly striking in that Example 13 was so heavily loaded that it stuck to the mill while formulation 10 released easily. Similarly Examples 14 and 15 were more difficult to achieve release than 11 and 12 respectively.

Further examples were run, in accordance with the general example, to demonstrate compositional variances and the use of a brominated flame retardant. The formulations and test results are reported in Table V.

TABLE V

|  | Example 16 | Example 17 | Example 18 | Example 19 | Example 20 | Example 21 | Example 22 | Example 23 | Example 24 |
|---|---|---|---|---|---|---|---|---|---|
| COMPOSITION |  |  |  |  |  |  |  |  |  |
| Exact 4033 TPE | 60 | 120 | 60 | 120 | 60 | 60 | 60 | 60 | 60 |
| Kraton g1651 SEB Rubber |  |  |  |  | 60 |  |  |  |  |
| Tyrin 3615p Chlorinated Polyethylene | 60 | 60 | 60 | 60 |  | 60 | 60 | 60 | 60 |
| Alumina Trihydrate | 60 | 60 | 60 | 60 | 60 | 60 | 75 | 60 | 60 |
| Flamebloc 440, Barium Metaborate | 6 | 6 | 6 | 6 | 6 | 6 | 7.5 | 6 | 6 |
| Shellflex 371, Napthenic oil | 7.5 | 7.5 | 7.5 | 7.5 | 7.5 | 7.5 | 7.5 | 7.5 | 7.5 |
| Clay | 3 | 3 | 3 | 3 | 3 | 3 | 3 | 3 | 3 |
| TPE Stabilizer Blend (see Table II) | 4.5 | 4.5 | 4.5 | 4.5 | 4.5 | 4.5 | 4.5 | 4.5 | 4.5 |
| Araldite GT-7012, Solid Epoxy | 1.5 | 1.5 | 1.5 | 1.5 | 1.5 | 1.5 | 1.5 | 1.5 | 1.5 |
| Exact 4049, TPE | 60 | 0 | 60 | 0 | 60 | 60 | 60 | 60 | 60 |
| Calcium Stearate | 9 | 9 | 9 | 9 | 9 | 9 | 9 | 9 | 9 |
| Ultranox 877A Antioxidant | 1.5 | 1.5 | 1.5 | 1.5 | 1.5 | 1.5 | 1.5 | 1.5 | 1.5 |
| Polybond 3200, Maleated Polypropylene | 4.5 | 4.5 | 0 | 0 | 4.5 | 4.5 | 4.5 | 4.5 | 4.5 |
| Antimony Trioxide | 12 | 12 | 12 | 12 | 12 | 12 | 12 | 24 | 36 |
| Saytex 102E | 75 | 75 | 75 | 75 | 75 | 112.5 | 112.5 | 75 | 112.5 |
| PROPERTIES |  |  |  |  |  |  |  |  |  |
| Limiting Oxygen Index | 25 | 25 | 25 | 25 | 28 | 30 | 29 | 29 | 30 |
| Gauge | 10 | 10 | 10 | 8.5 | 11 | 7 | 6 | 10 | 6 |
| Elmendorf Tear (grams/mil) |  |  |  |  |  |  |  |  |  |
| TD | 90 | 69 | 58 | 42 | 76 | 56 | 57 | 73 | 45 |
| MD | 160+ | 107 | 111 | 84 | 64 | 163+ | 260+ | 163+ | 236 |
| Tensile Properties |  |  |  |  |  |  |  |  |  |
| TD |  |  |  |  |  |  |  |  |  |
| Tens. Str. | 1133 | 1347 | 974 | 1054 | 1375 | 936 | 989 | 1358 | 1089 |
| 100% Mod | 451 | 358 | 403 | 428 | 419 | 372 | 376 | 612 | 599 |
| % Elongation | 950 | 920 | 916 | 753 | 815 | 950 | 1001 | 981 | 918 |
| MD |  |  |  |  |  |  |  |  |  |
| Tens. Str. | 1582 | 1471 | 1320 | 1403 | 1478 | 867 | 857 | 1411 | 1223 |
| 100% Mod | 595 | 402 | 431 | 477 | 489 | 490 | 526 | 773 | 776 |
| % Elongation | 968 | 886 | 933 | 736 | 747 | 703 | 614 | 788 | 700 |
| Cold Crack |  |  |  |  |  |  |  |  |  |
| 10 lb. Rubber Masland |  |  |  |  |  |  |  |  |  |
| UL 94 VTM | Fail | Fail | Fail | Fail | VTM – 2 | VTM – 0 | VTM – 0 | VTM – 0 | VTM – 0 |
| Shore A | 75 | 70 | 75 | 70 | 65 | 68 | 75 | 72 | 73 |

TABLE V-continued

| | Example 16 | Example 17 | Example 18 | Example 19 | Example 20 | Example 21 | Example 22 | Example 23 | Example 24 |
|---|---|---|---|---|---|---|---|---|---|
| General Comments | Milled ok | 1) Milled ok 2) Surface of sheet "nervy" | Milled ok | 1) Milled ok 2) Surface of sheet "nervy" | 1) Milled ok 2) Dripped burning drops during UL 94 VTM | Milled ok | Milled ok | Milled ok | Milled ok |

Table V demonstrates that brominated flame retardants can be incorporated into formulations in accordance with the present invention. Examples 16 and 17 contain the maleated polypropylene, while 18 and 19 do not. Comparisons of Examples 15 to 19 and 17 to 19 demonstrate that the maleated polypropylene improves the tear strength and tensile properties. Example 20 is the same as 16 but uses Kraton SEB rubber instead of chlorinated polyethylene. Example 21 is the same as 16 but with an increased Saytex 102 level. Example 22 is the same as 16 but with an increase in the amount of the Saytex 102, Alumina trihydrate and Barium metaborate levels. Example 24 is the same as 16 but further increases the Saytex 102 and Antimony oxide. Comparisons of Examples 21, 22, 23, and 24 to 18 demonstrate large improvements in tear strength and flammability, but no difference or loss in tensile properties.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. A thermoplastic elastomer composition for use in automotive interiors, wallcoverings, upholstery, advertising films, and tenting which comprises a major amount of a blend of thermoplastic elastomer comprising:
   a major amount of a thermoplastic elastomer or elastomers having a weighted average melt index of less than 6,
   a minor amount of polymeric elastomer,
   a flame retardant, selected from the group consisting of antimony trioxide, alumina tribydrate, barium metaborate, decabromodi-phenyl oxide, ethylene bis (tetrabromophthalimide), decabromodiphenyl oxide, tetradlecabromodiphenoxybenzene, ethylenebis (dibromonorbornanedicarboximide), or combinations thereof;
   a maleated polypropylene,
   a filler material; and
   having:
      a Shore A hardness of at least about 65 as measured according to ASTM D-2240,
      a tensile strength of at least about 900 psi as measured according to ASTM D-882,
      a % elongation of at least about 900% as measured according to ASTM D-882,
      a density of about 1.0 g/cc, and wherein the article is ductile at about −60° F. when measured according to ASTM D-1790 and FS 191-method 5874, and
      a flammability rating of VTM-0 as measured according to UL-94.

2. The composition of claim 1 wherein the composition has a limiting oxygen index value of 26 to 31.

3. The composition of claim 1 wherein the composition has a limiting oxygen index value of 28 or higher.

4. The composition of claim 1 wherein the flame retardant is present in an amount of about 15% by weight and about 70% by weight based on the total weight of the composition.

5. The composition of claim 1 wherein the thermoplastic elastomers are present in an amount of 50% by weight to 95% by weight.

6. The composition of claim 1 wherein the thermoplastic elastomers are present in an amount of more than 60% by weight with more than 80% by weight being preferred.

7. The composition of claim 1 wherein the maleated polypropylene is present in an amount of about 0.25% by weight to about 5% by weight.

8. The composition of claim 1 wherein the filler is selected from the group consisting of talc, calcium carbonate, glass fibers, glass spheres, mica, alumina trihydrate, and clay.

9. The composition of claim 1 further including processing aids.

10. The composition of claim 1 which includes at least one of stabilizers, antioxidants, ultraviolet absorbers, metal soaps, anti-static agents, lubricants, nucleators, and pigments.

11. The composition of claim 1 having:
   a Shore A hardness of at least about 70 as measured according to ASTM D-2240,
   a tensile strength of at least about 1400 psi as measured according to ASTM D-882,
   a % elongation of at least about 900% as measured according to ASTM D-882, and
   a density of about 1.0 g/cc, and wherein the article is ductile at about −60° F. when measured according to ASTM D-1790 and FS 191-method 5874,
   a flammability rating of VTM-0 as measured according to UL-94.

12. The composition of claim 1 wherein the thermoplastic elastomer is a blend of (a) a copolymer of ethylene and butene and (b) a copolymer of ethylene and octene produced with a metallocene or Kaminsky catalyst and having a molecular weight distribution (Mw/Mn) which is less than or equal to 3, wherein the ethylene-butene copolymer is present in the blend in an amount of about 10 to 40% by weight and the ethylene-octene copolymer is present in the blend in an amount of about 10 to 40% by eight.

13. The composition of claim 12 wherein the blend includes at least one of a stabilizer, an antioxidant, an ultraviolet absorber, a metal soap, an anti-static agent, a lubricant, a nucleator, a pigment, a fibrous material, or a mixture thereof.

14. The composition of claim 1 wherein said thermoplastic elastomer or elastomers have a weighted average melt index of less than 3.

15. The composition of claim 1 wherein said thermoplastic elastomer or elastomers have a weighted average melt index of less than 2.

16. The composition of claim 1 wherein said flame retardant is a mixture of alumina trihydrate, barium metaborate, and antimony trioxide.

17. The composition of claim 16 wherein said alumina trihydrate is a majority amount of said mixture and said barium metaborate and antimony trioxide are each in an amount less than 30% by weight of said mixture.

18. The composition of claim 1 wherein said polymeric elastomer is present in an amount of 30% or less by weight based upon the weight of the polymers and elastomers.

19. The composition of claim 1 wherein said polymeric elastomer is present in an amount of 20% or less by weight based upon the weight of the polymers and elastomers.

20. The composition of claim 1 wherein said polymeric elastomer is present in an amount of 10% or less by weight based upon the weight of the polymers and elastomers.

21. The composition of claim 1 wherein said filler material is present in an amount of 50% or less by weight based upon the weight of the polymers and elastomers.

22. The composition of claim 1 wherein said filler material is present in an amount of 40% or less by weight based upon the weight of the polymers and elastomers.

23. The composition of claim 1 wherein said filler material is present in an amount of 30% or less by weight based upon the weight of the polymers and elastomers.

24. The composition of claim 1 wherein said filler material is present in an amount of 20% or less by weight based upon the weight of the polymers and elastomers.

25. The composition of claim 1 wherein said filler material is present in an amount of 10% or less by weight based upon the weight of the polymers and elastomers.

26. A thermoplastic file for use in automotive interiors, wallcoverings, upholstery, advertising films, and tenting wherein the film has a thickness of 20 mils or less and comprises a major amount of a blend of thermoplastic elastomer comprising:

a major amount of a thermoplastic elastomer or elastomers having a weighted average melt index of less than 6, a minor amount of polymeric elastomer, a flame retardant, selected from the group consisting of antimony trioxide, alumina tribydrate, barium metaborate, decabromodi-phenyl oxide, ethylene bis (tetrabromophthalimide), decabromodiphenyl oxide, tetradecabromodiphenoxybenzene, ethylenebis (dibromonorbornanedicarboximide), or combinations thereof;

a maleated polypropylene, a filler material; and having:

a Shore A hardness of at least about 65 as measured according to ASTM D-2240, a tensile strength of at least about 900 psi as measured according to ASTM D-882, a % elongation of at least about 900% as measured according to ASTM D-882, a density of about 1.0 g/cc, and wherein the article is ductile at about −60° F. when measured according to ASTM D-1790 and FS 191-method 5874, and a flammability rating of VTM-0 as measured according to UL-94.

27. The thermoplastic film of claim 26 wherein the film has a thickness of 15 mils or less.

28. The thermoplastic film of claim 26 wherein the film has a thickness of 12 mils or less.

29. The thermoplastic film of claim 26 wherein the film has a thickness of 10 mils or less.

* * * * *

UNITED STATES PATENT AND TRADEMARK OFFICE
CERTIFICATE OF CORRECTION

PATENT NO. : 6,437,035 B1  Page 1 of 1
DATED : August 20, 2002
INVENTOR(S) : Young It is certified that error appears in the above-identified patent and that said Letters Patent is hereby corrected as shown below:

Column 12,
Line 67, "eight" should read -- weight --.

Column 14,
Line 12, "tribydrate" should read -- trihydrate --.

Signed and Sealed this

Fourth Day of February, 2003

JAMES E. ROGAN
*Director of the United States Patent and Trademark Office*